US009678787B2

(12) United States Patent
Wen et al.

(10) Patent No.: US 9,678,787 B2
(45) Date of Patent: Jun. 13, 2017

(54) FRAMEWORK FOR AUTHORING DATA LOADERS AND DATA SAVERS

(71) Applicant: Microsoft Corporation, Redmond, WA (US)

(72) Inventors: Tong Wen, Quincy, MA (US); Parry Husbands, Waltham, MA (US); Samuel Weiss, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 14/286,315

(22) Filed: May 23, 2014

(65) Prior Publication Data

US 2015/0339154 A1 Nov. 26, 2015

(51) Int. Cl.
| | | |
|---|---|---|
| *G06F 9/46* | (2006.01) | |
| *G06F 9/52* | (2006.01) | |
| *G06F 9/54* | (2006.01) | |
| *G06F 9/44* | (2006.01) | |
| *G06F 9/48* | (2006.01) | |

(52) U.S. Cl.
CPC .......... *G06F 9/46* (2013.01); *G06F 8/00* (2013.01); *G06F 9/4843* (2013.01); *G06F 9/52* (2013.01); *G06F 9/54* (2013.01); *G06F 8/36* (2013.01)

(58) Field of Classification Search
None
See application file for complete search history.

(56) References Cited

U.S. PATENT DOCUMENTS

| | | | |
|---|---|---|---|
| 5,095,522 A | 3/1992 | Fujita et al. | |
| 5,978,579 A | 11/1999 | Buxton et al. | |
| 5,999,987 A | 12/1999 | Arjomandi | |
| 6,199,068 B1 | 3/2001 | Carpenter | |
| 6,718,332 B1 | 4/2004 | Sitaraman et al. | |
| 6,813,770 B1 | 11/2004 | Allavarpu et al. | |
| 6,980,332 B2 * | 12/2005 | Simske .............. | H04N 1/00795 358/445 |

(Continued)

FOREIGN PATENT DOCUMENTS

| | | |
|---|---|---|
| WO | 02069142 A1 | 9/2002 |
| WO | 02091174 A2 | 11/2002 |
| WO | 2002091174 A2 | 11/2002 |

OTHER PUBLICATIONS

"A Scientific Workflow Solution to the Archiving of Digital Media", Chien-Yi Hou et al, HPDC workshop on "Scientific Workflow Systems", May 2006.*

(Continued)

*Primary Examiner* — Gregory A Kessler
(74) *Attorney, Agent, or Firm* — Davin Chin; Chin IP, PLLC

(57) ABSTRACT

Implementing static loaders and savers for the transfer of local and distributed data containers to and from storage systems can be difficult because there are so many different configurations of output formats, data containers and storage systems. Described herein is an extensible componentized data transfer framework for performant and scalable authoring of data loaders and data savers. Abstracted local and distributed workflows drive selection of plug-ins that can be composed by the framework into particular local or distributed scenario loaders and savers. Reusability and code sparsity are maximized.

20 Claims, 7 Drawing Sheets

(56) References Cited

U.S. PATENT DOCUMENTS

| | | |
|---|---|---|
| 7,099,350 B2 | 8/2006 | Peterson |
| 7,159,211 B2 | 1/2007 | Jalan et al. |
| 7,346,901 B2 | 3/2008 | Syme et al. |
| 7,676,789 B2 | 3/2010 | Omiya et al. |
| 7,676,791 B2 | 3/2010 | Hamby et al. |
| 7,725,679 B1 | 5/2010 | Anderson et al. |
| 7,743,087 B1 | 6/2010 | Anderson et al. |
| 7,783,686 B2 | 8/2010 | Gates et al. |
| 7,853,937 B2 | 12/2010 | Janczewski |
| 8,046,746 B2 | 10/2011 | Tillmann et al. |
| 8,156,153 B2 | 4/2012 | Wang et al. |
| 8,296,743 B2 | 10/2012 | Linderman et al. |
| 8,458,680 B2 | 6/2013 | Crutchfield et al. |
| 8,739,137 B2 | 5/2014 | Siskind et al. |
| 8,745,603 B2 | 6/2014 | McGuire et al. |
| 8,745,803 B2 | 6/2014 | Fulton et al. |
| 8,893,155 B2 | 11/2014 | Warren et al. |
| 8,924,944 B2 | 12/2014 | Warren et al. |
| 9,176,769 B2 | 11/2015 | Raghunathan et al. |
| 9,354,924 B2 | 5/2016 | Warren et al. |
| 2002/0138321 A1* | 9/2002 | Yuan ..................... G06Q 10/10 705/80 |
| 2003/0061602 A1 | 3/2003 | Graham et al. |
| 2003/0115573 A1 | 6/2003 | Syme et al. |
| 2003/0159130 A1 | 8/2003 | Broussard et al. |
| 2005/0102353 A1 | 5/2005 | Murphy et al. |
| 2005/0149903 A1 | 7/2005 | Archambault et al. |
| 2005/0188379 A1 | 8/2005 | Inagaki et al. |
| 2005/0240621 A1 | 10/2005 | Robertson et al. |
| 2006/0206903 A1 | 9/2006 | Lawrence et al. |
| 2007/0028210 A1 | 2/2007 | Meijer et al. |
| 2007/0124363 A1 | 5/2007 | Lurie et al. |
| 2007/0220531 A1 | 9/2007 | Korn |
| 2008/0195646 A1 | 8/2008 | Meijer et al. |
| 2008/0228853 A1 | 9/2008 | Brinck et al. |
| 2008/0320453 A1 | 12/2008 | Meijer et al. |
| 2009/0113216 A1 | 4/2009 | Chen et al. |
| 2010/0162211 A1 | 6/2010 | Ostrovsky et al. |
| 2010/0211753 A1 | 8/2010 | Ylonen |
| 2010/0235412 A1 | 9/2010 | Kawachiya et al. |
| 2010/0299660 A1 | 11/2010 | Torgersen et al. |
| 2011/0010715 A1 | 1/2011 | Papakipos et al. |
| 2011/0022794 A1 | 1/2011 | Jibbe et al. |
| 2011/0179402 A1 | 7/2011 | Buckley et al. |
| 2011/0265067 A1 | 10/2011 | Schulte et al. |
| 2011/0321010 A1 | 12/2011 | Wang |
| 2012/0030672 A1 | 2/2012 | Zygmuntowicz et al. |
| 2012/0066193 A1 | 3/2012 | King et al. |
| 2012/0158817 A1 | 6/2012 | Lauderdale et al. |
| 2012/0185824 A1 | 7/2012 | Sadler et al. |
| 2012/0222005 A1 | 8/2012 | Harris et al. |
| 2013/0166568 A1 | 6/2013 | Binkert et al. |
| 2014/0006473 A1 | 1/2014 | Raghunathan et al. |
| 2014/0007060 A1 | 1/2014 | Warren et al. |
| 2014/0059056 A1 | 2/2014 | Chaney et al. |
| 2014/0137087 A1 | 5/2014 | Cimadamore et al. |
| 2014/0189662 A1 | 7/2014 | Mameri et al. |
| 2014/0282614 A1 | 9/2014 | Warren et al. |
| 2015/0040141 A1 | 2/2015 | Warren et al. |
| 2016/0239289 A1 | 8/2016 | Warren et al. |

OTHER PUBLICATIONS

U.S. Appl. No. 13/828,981, Jenkins, et al., "Providing Distributed Array Containers for Programming Objects", Filed Date: Mar. 14, 2013.

"Cutting Edge: Collections and Data Binding", Retrieve from <<http:l/web.archive.org/web/20090113060728/http://msdn.microsoft.com/en-us/magazine/cc163798.aspx>>, May 2005, 9 Pages.

"Non Final Office Action Issued in U.S. Appl. No. 13/539,244", Mailed Date: Apr. 24, 2014, 18 pages.

"Notice of Allowance Issued in U.S. Appl. No. 13/539,244", Mailed Date: Sep. 2, 2014, 22 pages.

"Notice of Allowance Issued in U.S. Appl. No. 13/539,250", Mailed Date: Jul. 6, 2015, 13 Pages.

"Serviceware Downloads", Retrieved from <>, Retrieved Date: Feb. 21, 2013, 22 Pages.

Allen, et al., "Type Checking Modular Multiple Dispatch with Parametric Polymorphism and Multiple Inheritance", in Proceedings of the ACM International Conference on Object Oriented Programming Systems Languages and Applications, Oct. 22-27, 2011, 19 Pages.

Arabe, et al., "Dome: Parallel Programming in a Distributed Computing Environment", In Proceedings of the 10th International Parallel Processing Symposium, Apr. 15, 1996, pp. 218-224.

Box, et al., "An Introduction to P/Invoke and Marshaling on the Microsoft .NET Compact Framework", Mar. 2003, 8 Pages.

Cardelli, Luca, "Obliq A Language with Distributed Scope", Retrieved from <<http:www.hpl.hp.com/techreports/Compaq-DEC/SRC-RR-122.pdf>>, Jun. 3, 1994, 70 Pages.

Chang, et al., "Evaluating the Performance Limitations of MPMD Communication", In Proceedings of the ACM/IEEE Conference on Supercomputing (CDROM), Nov. 15, 1997, 10 Pages.

Dragos, et al., "Compiling Generics Through User-Directed Type Specialization", In Proceedings of the 4th workshop on the Implementation, Compilation, Optimization of Object-Oriented Languages and Programming Systems, Jul. 6-10, 2009, 6 Pages.

Ex Parte Quayle Action in U.S. Appl. No. 15/139,918, mailed Jul. 1, 2016, 5 Pages.

Hassen, et al., "Hawk: A Runtime System for Partitioned Objects", In Proceedings of Parallel Algorithms and Applications, vol. 12, Issue 1-3, Aug. 1997, pp. 205-230.

Hassen, Saniya Ben, "Prefetching Strategies for Partitioned Shared Objects", In Proceedings of the 29th Annual Hawaii International Conference on System Sciences, Jan. 3, 1996, pp. 261-270.

Hoogerwerf, Ronnie, "The "Cloud Numerics" Programming and Runtime Execution Model", Retrieved from <>, Jan. 11, 2012, 9 Pages.

Kovari, et al., "WebSphere and .NET Coexistence", In Redbooks of IBM, Mar. 2004, 612 Pages.

Liang, Sheng, "The Java Native Interface", In Programmer's Guide and Specification, The Java Series, 1999, 168 Pages.

Meier, et al., "Improving .NET Application Performance and Scalability", Retrieved from <<http://msdn.microsoft.com/en-In/library/ff647768.aspx>>, May 2004, 63 Pages.

Milewicz, et al., "SimpleConcepts: Support for Constraints on Generic Types in C++", In Federated Conference on Computer Science and Information Systems, Sep. 8-11, 2013, pp. 1535-1540.

Newton, T., "Demystifying Shims- or- Using the App Com pat Toolkit to Make Your Old Stuff Work with Your NewStuff", Retrieved from <<https://blogs.technet.microsoft.com/askperf/2011/06/17/demystifying-shims-or-using-the-app-compat-toolkit-to-make-your-old-stuff-work-with-your-new-stuff/>>, Jun. 17, 2011, 6 Pages.

Non Final Office Action Issued in U.S. Appl. No. 13/828,981, Mailed Date: Mar. 26, 2014, 12 Pages.

Notice of Allowance in U.S. Appl. No. 15/139,918, mailed Sep. 12, 2016, 10 pages.

Notice of Allowance in U.S. Appl. No. 15/139,918, mailed Sep. 26, 2016, 5 pages.

Notice of Allowance Issued in U.S. Appl. No. 13/828,981, Mailed Date: Aug. 1, 2014, 9 Pages.

Notice of Allowance Issued in U.S. Appl. No. 14/520,777, Mailed Date: Dec. 1, 2015, 9 Pages.

Notice of Allowance Issued in U.S. Appl. No. 14/520,777, Mailed Date: Feb. 1, 2016, 7 Pages.

Shaprio, et al., "SSP Chains: Robust, Distributed References Supporting Acyclic Garbage Collection", in Technical Report on SSP Chains: Robust, Distributed References Supporting Acyclic Garbage Collection, May 24, 2006, 41 Pages.

Sinha, et al., "Adaptive Runtime Partitioning of AMR Applications on Heterogeneous Clusters", In Proceedings of the 3rd IEEE International Conference on CLuster Computing, Mar. 2001, 8 Pages.

(56) References Cited

OTHER PUBLICATIONS

Strahl, Rick, "Visual FoxPro Web Services Revisited", Retrieved from <<http://www.code-magazine.com/articleprint.aspx?quickid=0703062&printmode=true>>, Oct. 3, 2007, 28 Pages.
Vangas, et al., "Strongly Typed Metadata Access in Object Oriented Programming Languages with Reflection Support", In Baltic J. Modern Computing, vol. 1, Jul. 30, 2013, 24 Pages.

* cited by examiner

FRAMEWORK FOR AUTHORING DATA LOADERS AND DATA SAVERS

BACKGROUND

The term "big data" refers to data sets that are so large that the data sets cannot be processed using traditional database management tools and traditional data processing applications and techniques. Big data is sometimes described in terms of volume, velocity and variety. The amount of data available for processing is increasing because of the volume of data that has been captured over the years, because of the quantity of data collected by sensors and other machines, because of the wide-spread use of new applications including but not limited to social media, because of the proliferation of mobile devices and for many other reasons. Data is being collected at a velocity that previously was impossible. Finally, the variety of the different formats in which data is provided is unprecedented. Structured, unstructured, numeric, text, audio, video and many other forms of data are generated. There is great interest in using this wealth of information in predictive analysis and in various other ways.

SUMMARY

Input and output operations involved in data transfer can be abstracted into generic workflows of components for use in composition into particular data loaders and data savers for local and distributed data flow scenarios. The components can be implemented as plug-ins that can be composed into data loaders and/or data savers by a data transfer framework. Data transfer executables such as data loaders and data savers for the transfer of local and distributed data containers to and from storage systems and from one data format to another can be constructed dynamically by a data transfer framework. The data transfer framework can receive plug-ins via strongly typed component APIs (application programming interfaces) or program modules which can be composed into data loaders and/or data savers in a way that maximizes code modularity and reusability while enhancing performance and type safety of data transfers. Coding structures can be standardized by using templates for generic workflows and standardized plug-ins. A level of indirection between application code and the generation framework can eliminate the need to change user application program interfaces or modules when changes to the framework occur. That is, changes made to the data transfer framework can be made transparent to the application code using indirection.

A local workflow comprises a chain of components connected by the data flow. A distributed workflow refers to parallel executions of workflows on multiple processors or on multiple computing machines with data communications and synchronizations between the processes. A distributed workflow can reuse most of the components of a corresponding local workflow. The generic workflows implement the common logic and expose strongly typed interfaces for component plug-ins. A particular data loader or data saver can be an instantiated workflow where the components of the workflow are particular to a configuration, that is, to the data flow scenario (local or distributed), to the type of data format, to the storage system and to the data container type. As the component (plug-in) library is created, composing a data loader or data saver becomes easier and easier because it is more likely that already existing components can be reused.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
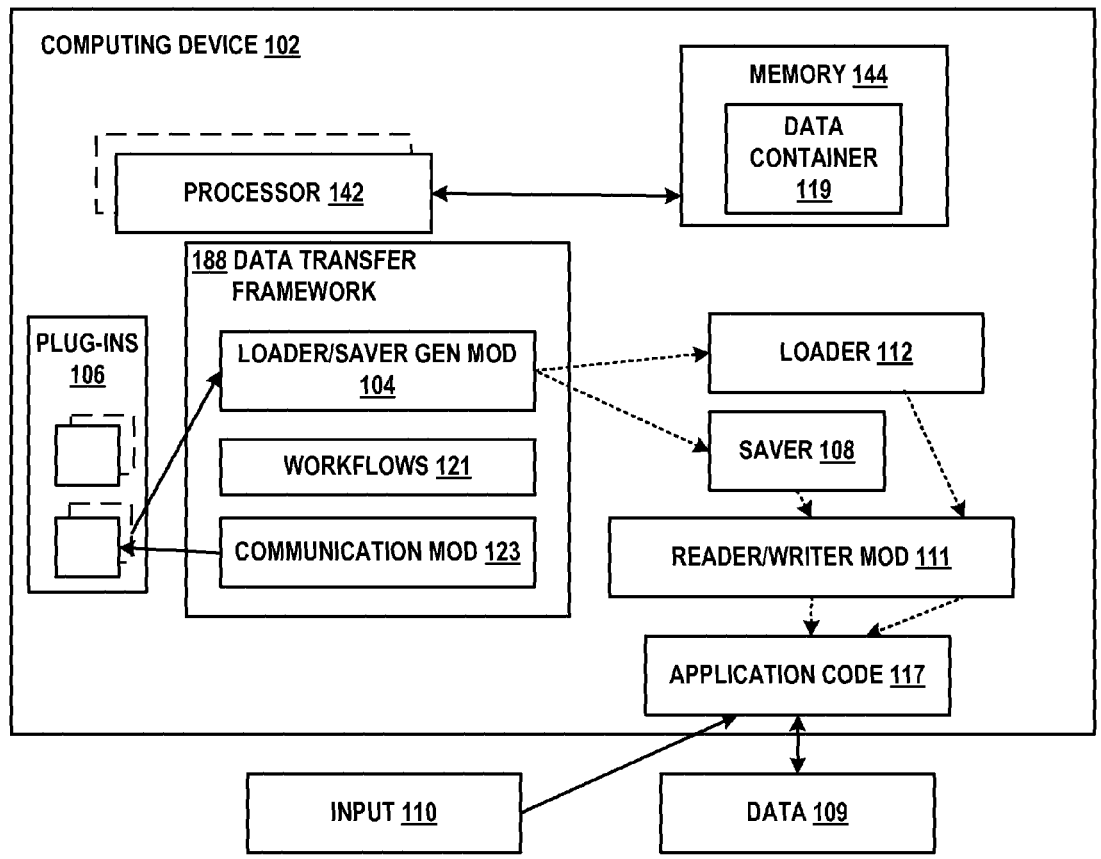
FIG. 1a illustrates an example of a system 100 comprising a data transfer framework that can be used to author data loaders and data savers in accordance with aspects of the subject matter described herein.

Creating data loaders and data savers for the transfer of local and distributed data containers to and from storage systems is challenging partly because there are so many different configurations of data formats, data containers and storage systems. Thus it can be difficult to have a static data loader or data saver for each possible combination of local or distributed data transfer, data container type, data format and storage system type. For example, data transfer can be local or distributed. Data containers can contain data in the format of numeric arrays, data tables, streaming data tables, SQL tables, Hive tables, and so on. Examples of data formats include but are not limited to CSV (ASCII, Base64 and UTF8), TSV with user specified delimiters, ARFF, Hadoop Sequence File Format, SvmLight, Avro, BOND, custom output formats, etc. Storage systems can be local or shared or as a service. Examples include but are not limited to regular file systems either local or shared or on internet (HTTP), distributed file systems such as HDFS (HDInsight), databases on premise or as a service such as SQL and SQL Azure, storage services such as Azure Blobs and Tables, Amazon Web Service, Google Cloud Platform, etc. Thus for just five different file formats, five different storage systems and five different container types, 125 (5 times 5 times 5) different loaders and savers would be needed. New formats and storage systems are continually being developed, creating a need for an I/O (input/output) infrastructure that can support a large number of possible configurations and that can accommodate future innovations in the field.

In response to the above described considerations, an extensible I/O infrastructure is described herein that potentially can support any possible set of configurations. For example, for five different file formats, five different storage systems and five different container types, instead of 125 (5 times 5 times 5) different loaders and savers, only 15 (5 plus 5 plus 5) different components would be needed to create the 125 different types of loaders and savers. Each component can be independent of others in the workflow. That is, for example, to output the same container type to two different storage systems in the same format, a second data saver can reuse at least the decomposer and formatter components from the first data saver. The framework described herein can dynamically (at runtime) create data loaders and data savers using a componentized approach in which components (plug-ins) are created and can be reused. Plug-ins can be provided with framework software and/or can be provided by a third-party user. Components can be strongly typed to increase the likelihood that potentially costly runtime errors are avoided. Because the data transfer framework implements the logic that is generic to loaders and savers and handles communication and synchronization between parallel processes, users can focus on the typically easier task of customizing individual components.

Decomposition of operations into components increases code modularity and reusability. Constructing a loader or saver by composition enables an architecture that can scale as new configurations arise. Blocking is made explicit in the workflows so that performance tuning by chunking can be performed by the decomposer (saver) and endpoint (loader) components and can be reused. The size of the executable for local data transfer scenarios is smaller because local savers do not have to include the code to handle distributed data transfer scenarios.

Framework for Authoring Data Loaders and Data Savers

FIG. 1a illustrates an example of a system 100 comprising a framework that can be used to author data transfer executables including for example, data loaders and/or data savers in accordance with aspects of the subject matter described herein. In this context, a software framework is an abstraction in which software implementing a generic template can be selectively changed by additional (possibly user-written) code as plug-ins, thus providing application-specific software. This framework can be a universal, reusable software platform to develop data transfer executables as data loaders and/or data savers for particular data transfer configurations. It can include support programs, a compiler, code libraries, and program modules (application programming interfaces (APIs)) that bring together all the different components to enable development of a project or solution. As in other frameworks, unlike in libraries or normal user applications, the overall program's flow of control is not dictated by the caller, but by the framework. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 can include some or all of the following items: one or more program modules that receive user input, one or more pairs of program modules that read/write data in different formats, one or more libraries of components (plug-ins), one or more program modules that generate instances of particular loaders and/or savers and/or one or more program modules that comprise application code. System 100 can include generic workflows. System 100 can include communication and/or synchronization modules. System 100 or parts thereof can comprise a data transfer framework. Components can be strongly typed to enable static type checking at compilation time, increasing the likelihood that potentially costly runtime errors can be avoided.

In FIG. 1a input such as input 110 can be received by one or more program modules that receive user input. A program module that receives user input is represented in FIG. 1a as incorporated into application code 117. Input 110 can include parameters describing or identifying aspects of data transfer scenarios. User input 110 can include input directly or indirectly provided to a data transfer framework such as data transfer framework 188. User input 110 can include input that identifies a particular pair of reader/writers to be used in the data transfer process. User input 110 can include but is not limited to: a location of data to be loaded or saved, a format in which the data is received, a format into which the data is to be converted, a destination of data to be loaded or saved, a type of container into which the data is to be loaded or from which the data is to be saved, an indication of local or distributed data transfer scenario, a type of storage system to be read from or into, a direction of data transfer (input or output) and so on.

A program module that includes pairs of program modules that read/write data in different formats or from different storage systems is represented in FIG. 1a by reader/writer module 111. Alternatively, (not shown) the reader/writer module can be separated into one or more reader modules and one or more writer modules or in other ways known to those of skill in the art. Reader/writer module 111 can include or can call a reader and/or a writer associated with a particular type of file format or storage system or data container. For example, the data transfer framework may include a number of pairs of reader/writers where one pair of reader and writer reads and writes a file in CSV format, and another pair of reader and writer reads and writes a file in a second (different) kind of format and so on. Reader/writer module 111 can manage the available configurations for a particular file format or storage system or data container. Application code such as application code 117 can call into the reader/writer module instead of into the framework to create a level of indirection.

Reader/writer module 111 can use user input information specifying a storage system type, a container type, local or distributed data transfer scenario indicator and a data transfer direction (input or output) to select plug-ins from one or more plug-in libraries such as plug-in library 106. Plug-ins can be provided with the data transfer framework or can be provided by third parties (e.g., to provide custom code). The selected plug-ins can be passed to loader/saver generation module 104. Loader/saver generation module 104 can receive the plug-ins from reader/writer module 111 and can create an instance of a particular loader and/or saver. In the event that an incorrect component is received by the loader/saver generation module 104 (e.g., the reader/writer module passes a component of the wrong type to the loader/saver generation module 104), the loader/saver generation module 104 can raise an error and stop. Loader/saver generation module 104 can return the particular loader and/or saver to be used by the reader/writer module 111 to read or write the data (e.g., data 109). Data 109 can be local or distributed data and represents data that can be read by a data loader or written by a data saver. Data 109 can be in any format and stored in any storage system.

For example, suppose the user input 110 to application code 117 indicates a need to read from a storage system comprising a local file in CSV format into a local destination container comprising a data table. The application code 117 can call the CSV reader in the reader/writer module 111 which can in response pass the appropriate plug-ins (i.e., the plug-in for a local file type of storage system and the plug-in for the local data table type of container) from a plug-in library such as plug-in library 106 to the loader/saver generation module 104. The loader/saver generation module 104 can return an instantiation of a particular data loader composed from the plug-ins passed to it and can return the instantiated loader (e.g., loader 112) to the CSV reader. Alternatively, the application code can call the loader/saver generation APIs directly and invoke the loader to read from the local file into a data container such as data container 119 such as, for example a data table in memory. Similarly, the loader/saver generation module 104 can return an instantiation of a particular data saver composed from the plug-ins passed to it and can return the instantiated saver (e.g., saver 108) to a particular writer in the writer module 111. Alternatively, the application code can call the loader/saver generation APIs directly to get a particular loader.

The data loader described herein (e.g., data loader 112) is a program that transfers data into memory. The data saver described herein (e.g., data saver 108) is a program that writes data in memory to a destination. The data (e.g., data 109) that is transferred can be stored in any format. The data can be stored on any storage medium. The data can be stored in any kind of storage system. The data can be local or distributed. The data can be converted from one format to another format. The application code can use the instantiated loader to load data such as data 109 into a data container in memory or can use the instantiated saver to save data from memory into a storage system.

A data container as described herein is represented in FIG. 1a by data container 119. Instances of a data container can be collections of other items, elements or objects. A container can be used for storing items, elements or objects in an organized way. Access of items, elements or objects in the container can be bound to particular access rules. The size of the container can depend on the number of the items, elements or objects the container contains. Container elements can be accessed by an index, in order of LIFO (Last In First Out) or in order of FIFO (First In First Out). A container can be finite or infinite. A container can be value based or reference based. A value based container can store copies of items, elements or objects. That is, for example, if an object is accessed, a copy of the object can be returned. Changing an external object after the object has been inserted in the container does not affect the content of the container. A reference based container can store pointers or references to an item, element or object. If, for example, an object is accessed, a reference to the object can be returned. Changing an external object after it has been inserted in the container affects the content of the container. A container can be a single value container or as associative container. In a single value container, each item, element or object can be stored independently in the container and can be accessed directly or with an iterator. A container can be an associative container. An associative array, map, or dictionary is a container composed of (key,value) pairs, such that each key appears at most once in the container. The key can be used to find the value of an item, element or object, if it is stored in the container. Data structures that can be implemented by containers include arrays, lists, maps, queues, sets, stacks, tables, trees, and vectors.

A data transfer framework such as the data transfer framework 188 can include all or some of: a loader/saver generation module such as loader/saver generation module 104 that receives plug-ins and using generic workflows 121 creates a data loader and/or a data saver such as loader 112 and/or saver 108. In distributed data transfer scenarios, a communication and synchronization module such as communication module 123 can synchronize processing as described more fully elsewhere. The communication module 123 can also detect errors. For example, if a distributed data transfer scenario includes three processes (e.g., process 0, process 1 and process 2), if one of the processes fails, all the other participating processes in the distributed workflow have to be informed to avoid deadlock (where, for example, process 2 fails and process 1 is waiting for a message from process 2 that will never come). The data transfer framework can manage communication and synchronization between processes when a process fails. The data transfer framework can manage communication and synchronization between processes by throwing an exception and propagating the exception to the Rank 0 or first process (process 0). Process 0 can report the failure to all the other processes. Failure recovery during input can comprise stopping the processes and reading from the data source again. For output, write rollbacks can be performed. For example, suppose process 0 and process 1 have already written to the storage system when process 2 fails. In this case, the writes made by process 0 and process 1 can be rolled back.

Figure 1B:
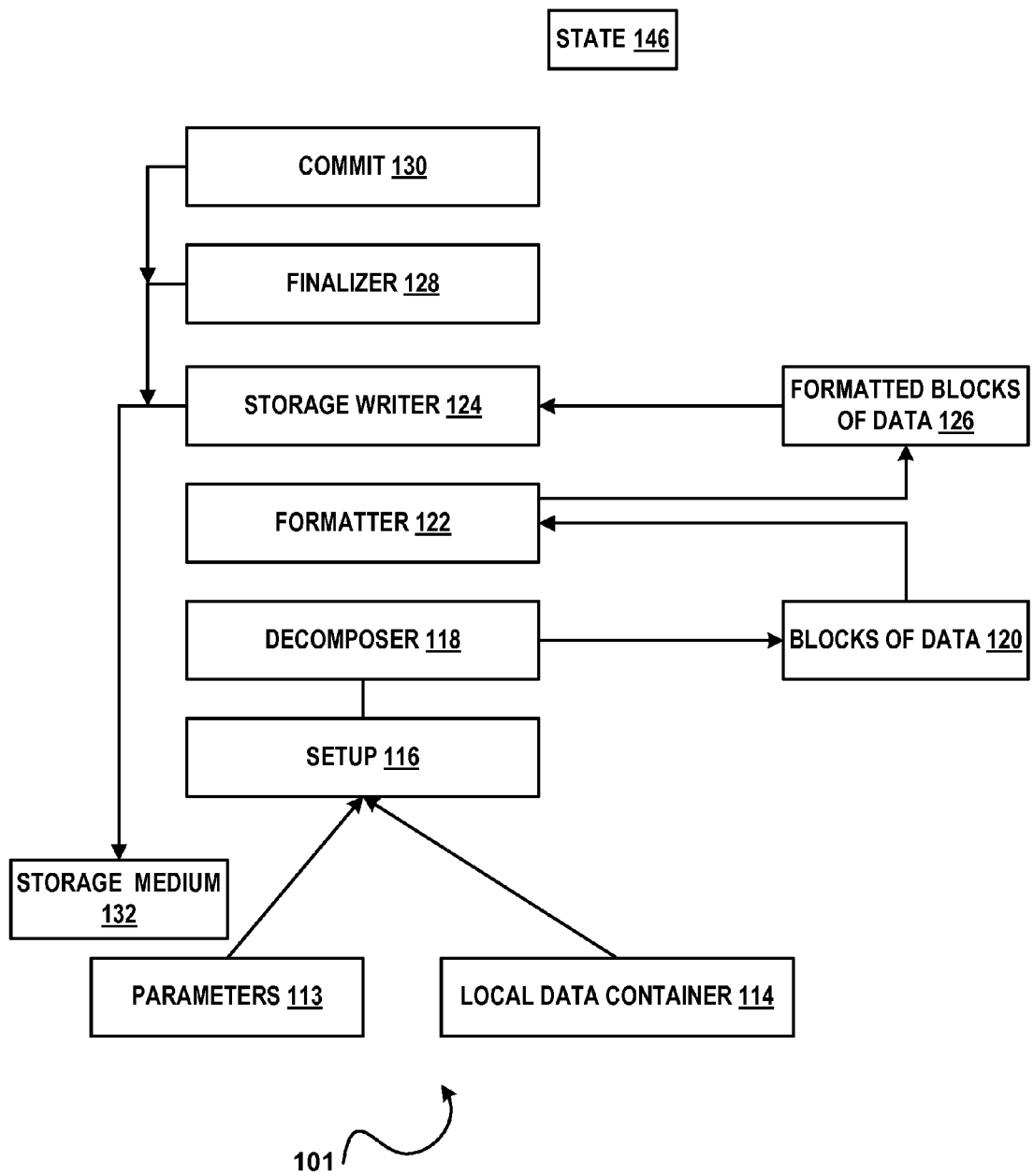
FIG. 1b illustrates an example 101 of an abstract local data output workflow in accordance with aspects of the subject matter described herein.

FIG. 1b illustrates an example 101 of a local output workflow. A local output workflow can include various workflow components that can be composed into a particular instantiation of a local saver. All or portions of a local saver composed from a local output workflow may execute on one or more computers or computing devices such as the computers described below with respect to FIG. 3. Contemplated computing devices on which a loader can run can include but are not limited to desktop computers, tablet computers, laptop computers, notebook computers, personal digital assistants, smart phones, cellular telephones, mobile telephones, and so on. A computing device can include one or more processors and a memory that communicates with the one or more processors. A local saver or portions thereof may be provided as a stand-alone system or as a plug-in or add-in. A local saver or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

A local workflow can include one or more local workflow components or plug-ins. A workflow component can comprise: a setup component such as setup component 116, a decomposer such as decomposer 118, a formatter such as formatter 122, a storage writer such as storage writer 124, a finalizer such as finalizer 128 and/or a committer such as commit component 130. The setup component 116 can receive a set of parameters such as parameters 113. The setup component 116 can receive an implicit or explicit reference to a local data container such as local data container 114. A local data container is a data container that comes from a single source (e.g., from one computer instead of from multiple different computers).

The setup component 116 can return a reference to the local data container. The setup component 116 can return state such as state 146 which is a modifiable value that indicates workflow state. The decomposer 118 can partition the data in a local data container such as local data container 114 into a sequence of chunks or blocks of data such as blocks of data 120. Blocking can be an efficient strategy to improve performance. For example, there may be too much data to process all at once. In accordance with some aspects of the subject matter described herein, a user can provide information associated with desired blocking characteristics. Default blocking characteristics can be provided by the data transfer framework (e.g., default blocking may be returning the entire data set or other default blocking paradigms may be employed). By providing the decomposer component, performance tailoring of data loader or data saver is enabled. Granularity of the blocking can be determined by the particular implementation of the decomposer. The blocks of data can be maintained in the output format so that the output can be examined more quickly. The formatter such as formatter 122 can serialize each block into the desired format, creating formatted blocks of data such as formatted blocks of data 126. In accordance with some aspects of the subject matter described herein, the data can be returned in the form of a stream of bytes stored in memory. In accordance with some aspects of the subject matter described herein, the data is stored as a MemoryStream object. The formatter 122 can change the workflow state 146 to indicate success or failure of the formatting function.

The storage writer 124 can write the formatted blocks of data 126 to a particular storage system such as storage medium 132. Storage writer 124 can update the workflow state 146 to indicate success or failure of the writing function. Alternatively the formatter and the storage writer can be combined into one component such as a serializer which combines the functionality of the formatter and storage writer components into one.

The finalizer 128 can receive a flag indicating whether the local serialization has succeeded or has not succeeded. In response to determining that the local serialization has not succeeded, a partial write can be backed out. If the local serialization operation was successful, the finalizer 128 can perform cleanup operations. The finalizer 128 can update the workflow state 146 to indicate success or failure of the finalizing function.

The commit component 130 can be optional. The commit component 130 can be retained in a local data flow to maintain symmetry with the distributed data saving scenario. Below is an example of program code that can be used to construct a local saver. Although this code is written in CSharp, it will be appreciated that the code to construct a local saver can be written in any number of different programming languages, known or developed in the future. An example of program code written in CSharp representing a sample output framework API and that constructs a local saver is:

```
Action<T1> CreateSaver<T1, TInput, TState, TChunk>(
    Func<T1, Tuple<TInput, TState>> setup,
    Func<TInput, IEnumerable<TChunk>> decomposer,
    Func<TState, TChunk, MemoryStream> formatter,
    Action<TState, MemoryStream> storageWriter,
    Action<TState, bool> finalizer,
    Action<TState> commit);
```

In CSharp an Action, such as Action<T1> in the first line of code above, is a delegate (type safe function pointer) object that returns no values. The Action type in the CSharp language is similar to a void method in other programming languages. A Func (Function) in CSharp does have a return value. CreateSaver is a generic method that takes Actions or Functions as arguments and returns an action that is the instantiation of the predefined workflow executing the saving operation for a particular configuration. The arguments to CreateSaver (e.g., setup, decomposer, formatter, storageWriter, finalizer and commit) can be plug-ins. CreateSaver can receive the plug-ins, connect them and provide a function that the user can call that will save the specified container at the designated location in a particular format.

The types that are between the angle brackets (< >) determine what the input and output types of the function or the action are. Setup, decomposer, formatter, etc. can be plug-ins that are passed in to CreateSaver as CSharp functions. For example, in the second line of the program code above, setup is a function that takes an argument of type T1 (e.g., one or more parameters) and produces an output of type TInput and an output of type TState. Setup can receive the local container (TInput) as either an implicit or explicit input argument and can return an object TState. TState can be an object that maintains the state for the entire workflow. Setup can also return the reference to the container (TInput).

Decomposer is a function that can take the TInput and can return a sequence of chunks (the IEnumerable interface indicates that a series of chunks of type TChunk are returned). The formatter is a function that can take the state of the workflow (TState) and one chunk. In the code above, the formatter serializes the data into a MemoryStream object. StorageWriter is an action (i.e., does not return a value) that can take the local state (TState) and the Memory buffer held by a MemoryStream object and can write it to a particular storage system. The Finalizer is an action that can take two input arguments (e.g., TState and a value that indicates whether the steps above were successful). The Committer is an action that can take one argument which is the state. As a result of executing the program code above, a saver, an Action that takes one input argument of type T1, is authored. The saver in this case is an action that takes only one input argument whose type is TI. It will be appreciated that multiple overloads to support a number of input arguments to the saver can exist. The function described plugs the provided components into the framework and returns the particular saver as a delegate. A delegate is a type that safely encapsulates a method, similar to a function pointer in C and C++.

Figure 1C:
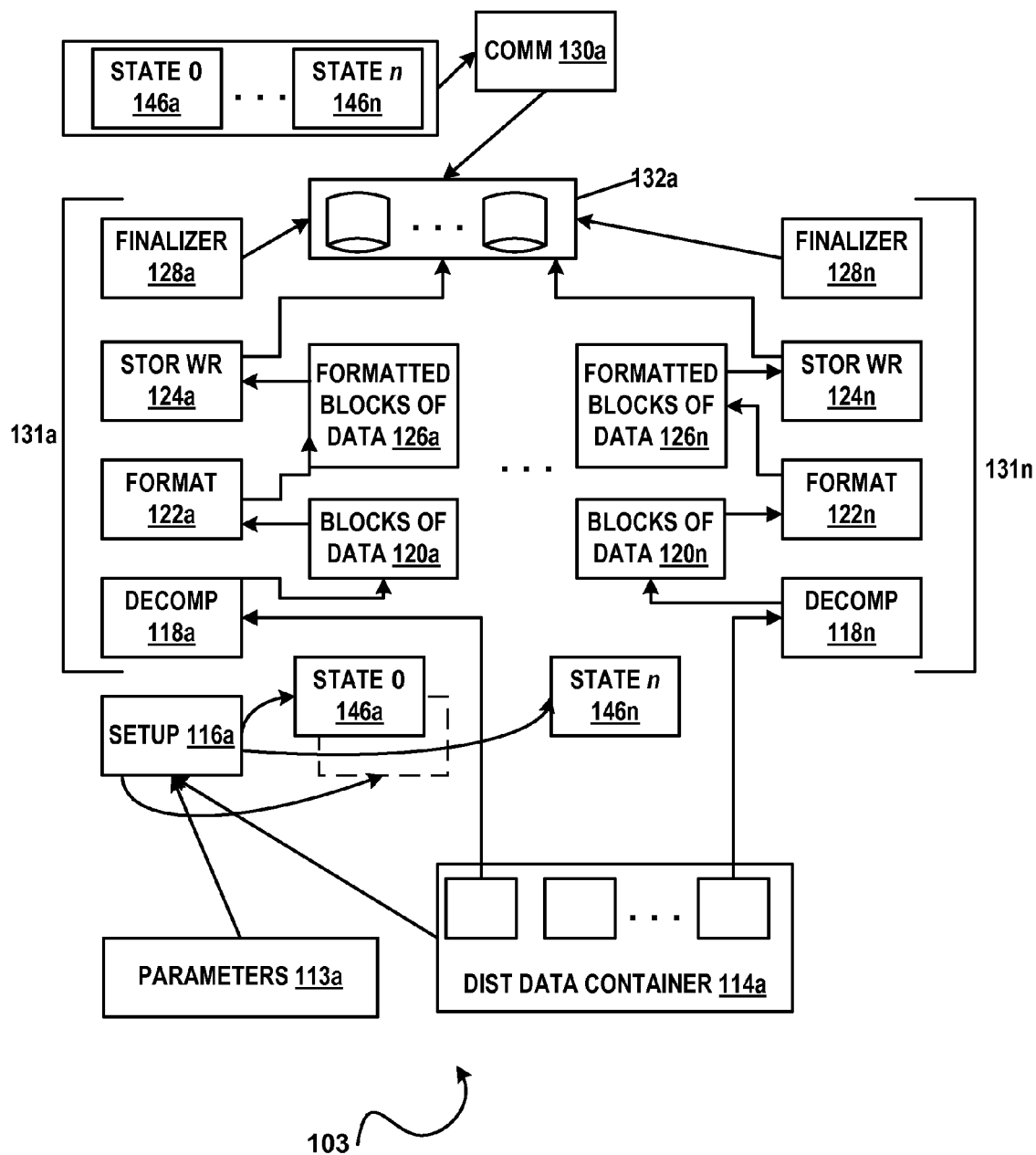
FIG. 1c illustrates an example 103 of an abstract distributed data output workflow in accordance with aspects of the subject matter described herein.

FIG. 1*c* illustrates an example 103 of a distributed output workflow comprising parallel executions of an analogous local output workflow. All or portions of a distributed saver composed from a distributed output workflow may execute on two or more processors of one or more computers or computing devices such as the computers described below with respect to FIG. 3. A distributed saver or portions thereof may be provided as a stand-alone system or as a plug-in or add-in.

A distributed output workflow or distributed saver or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

A distributed saver can execute on one or more computing devices. Contemplated computing devices include but are not limited to desktop computers, tablet computers, laptop computers, notebook computers, personal digital assistants, smart phones, cellular telephones, mobile telephones, and so on. A computing device can include one or more processors and a memory that communicates with the one or more processors.

A distributed saver can be run as parallel executions (e.g., process 0 131a, process 1 . . . process n 131n) of a corresponding local saver. A local output workflow does not involve communication. Communication and synchronization between the processes involved in a distributed data flow scenario can be handled by the data transfer framework. In a distributed output workflow a workflow component can comprise: a setup component such as setup component 116a, two or more decomposers such as decomposer 118a, etc. . . . to decomposer 118n, two or more formatters such as formatter 122a, etc. . . . to formatter 122n, two or more storage writers such as storage writer 124a, etc. . . . to storage writer 124n, etc., two or more finalizers such as finalizer 128a, etc. . . . to finalizer 128n, and/or a committer such as commit component 130a.

In accordance with some aspects of the subject matter described herein, the setup component 116a is executed only once by the coordinating process, (e.g., by process 0 which may also be referred to as the Rank 0 process). The setup component 116a can receive a set of parameters such as parameters 113a. The setup component 116a can receive an implicit or explicit reference to a distributed data container such as distributed data container 114a. A distributed data container is a data container whose data comes from multiple sources (e.g., from multiple different computers). The setup component 116a can return the reference to the distributed data container. The setup component 116a can return an array of state values, one state value for each process from process 0, etc. . . . to process n indicating success or failure of the process so far. For example, the state for process 0 is illustrated in FIG. 1c as state 146a. State 146a is a modifiable value that maintains workflow state for the first process. Similarly the state for a process n (an nth process) is illustrated in FIG. 1c as state 146n which is a modifiable value that maintains workflow state for the nth process where n can be any number of processes. In accordance with some aspects of the subject matter described herein, the data transfer framework distributes each state object to the process to which the state object belongs.

Two or more decomposers such as decomposer 118a, etc. . . . to decomposer 118n can partition the distributed data container 114a into a sequence of chunks or blocks of data such as blocks of data 120a, etc. . . . to blocks of data 120n. The blocks of data can be maintained in the output format so that the output can be examined more quickly. Two or more formatters such as formatter 122a, etc. . . . to formatter 122n can serialize each block of its corresponding blocks of data, e.g., blocks of data 120a, etc. . . . to blocks of data 120n into the desired format, creating formatted blocks of data such as formatted blocks of data 126a, etc. . . . to formatted blocks of data 126n. In accordance with some aspects of the subject matter described herein, the data can be returned in the form of a memory buffer as a byte sequence. The formatters formatter 122a, etc. . . . to formatter 122n can modify the corresponding workflow state 146a, etc. . . . to state 146n.

Two or more storage writers such as storage writer 124a, etc. . . . to storage writer 124n can write the corresponding formatted blocks of data 126a, etc. . . . to formatted blocks of data 126n to a particular storage system such as storage system 132a. Storage writer 124a, etc. . . . to storage writer 124n can update the corresponding workflow state 146a, etc. . . . to state 146n. Alternatively the formatter and the storage writer for a process can be combined into a component such as a serializer which combines the functionality of the formatter and storage writer components.

Two or more finalizers such as finalizer 128a, etc. . . . to finalizer 128n can receive a flag indicating whether the serialization for the process has succeeded or not. In response to determining that the local serialization has not succeeded, a partial write can be backed out or rolled back. If the local serialization operation was successful, the finalizer 128a, etc. . . . finalizer 128n can perform cleanup operations. The finalizer 128a, etc. . . . finalizer 128n can update the workflow state 146a, etc. . . . workflow state 146n.

In accordance with some aspects of the subject matter described herein, the first process (process 0 131a or Rank 0 process) can serve as the coordinating process. For example, suppose in a particular distributed data flow scenario, data processed by a number of different processes is to be saved to a container that is distributed across a number of disks. Process 0 can make sure that the correct portion of the data is saved to the correct portion of the storage medium. The coordinating process can be referred to as rank 0, process 1 can be referred to as rank 1, etc. In the event that an exception is thrown from a remote rank (e.g., rank 8) is thrown by a component of the distributed output workflow, the exception can be propagated to the rank 0 process. When an error condition is detected, the other processes can be notified so the other parallel processes can be aborted. Synchronization of the ending of the processes can be orchestrated so that deadlocks are avoided. When an exception is thrown during serialization the finalizer can receive a flag indicating a serialization failure. If no error in serialization is detected, the finalizer can receive a flag indicating success.

A commit component 130a in accordance with some aspects of the subject matter described herein can be executed only once by the first process (process 0 or Rank 0 process). If all the local workflows are successful, the data transfer framework can make a copy of the state object for each process and provide the collection of state objects to the first process (process 0 or Rank 0 process). The commit component 130a can performs a global commit operation at the Rank 0 process. Below is an example of program code that can be used to construct a distributed saver. Although this code is written in CSharp, it will be appreciated that the code to construct a distributed saver can be written in any number of different programming languages, known or developed in the future. An example of program code written in CSharp representing a sample output framework API and that constructs a distributed saver is:

```
Action<T1> CreateDistributedSaver<T1, TInput, TState, TChunk>(
    Func<T1, IMultipleStreamInstructions<TInput, TState>> setup,
    Func<TInput, IEnumerable<TChunk>> decomposer,
```

```
Func<TState, TChunk, MemoryStream> formatter,
Action<TState, MemoryStream> storageWriter,
Action<TState, bool> finalizer,
Action<TState[ ]> commit);
```

In the first line of code above the Action<T1> is a delegate object that returns no values. CreateDistributedSaver is a generic method that takes Actions or Functions as arguments and returns an action that is the instantiation of the predefined workflow executing the saving operation for a particular distributed configuration. The arguments to CreateDistributedSaver (e.g., setup, decomposer, formatter, storageWriter, finalizer and commit) can be plug-ins. CreateDistributedSaver can receive the plug-ins, connect them and provide a function that the user can call that will save the specified distributed container at the designated distributed location(s).

In the second line of the program code above, setup is a function that takes an argument of type T1 and returns a reference to the target distributed container (of type TInput) and an array of state objects of type TState, one for each process. Loader/saver generator module 104 distributes each state object to the corresponding process. The IMultipleStreamInstructions interface represents any object that can return a TInput object (the target distributed data container) and an array of TState objects.

Decomposer is a function that can take the TInput and can return a sequence of chunks (the IEnumerable interface indicates that a series of chunks of type TChunk are returned). The formatter is a function that can take the state of the workflow (TState) and one chunk. In the code above, the formatter serializes the data into a MemoryStream object as memory stream. StorageWriter is an action (i.e., does not return a value) that can take the local state (TState) and the memory buffer held by a MemoryStream object and can write it to a particular storage system. The Finalizer is an action that is local to each process. It can take two input arguments (e.g., TState and a value that indicates whether the steps above on all the processes were successful). If all the local workflows were successful, the generator can create a copy of each local state object and provide them to the first (Rank 0) process. The Committer is an action that can receive the copies and can perform a global commit at the first (Rank 0) process. As a result of executing the program code above, a saver, an action that takes one input argument T1, is authored. It will be appreciated that multiple overloads to support a number of input arguments to the saver can exist. The function described plugs the provided components into the framework and returns the particular saver as a delegate. A delegate is a type that safely encapsulates a method, similar to a function pointer in C and C++.

Figure 1D:
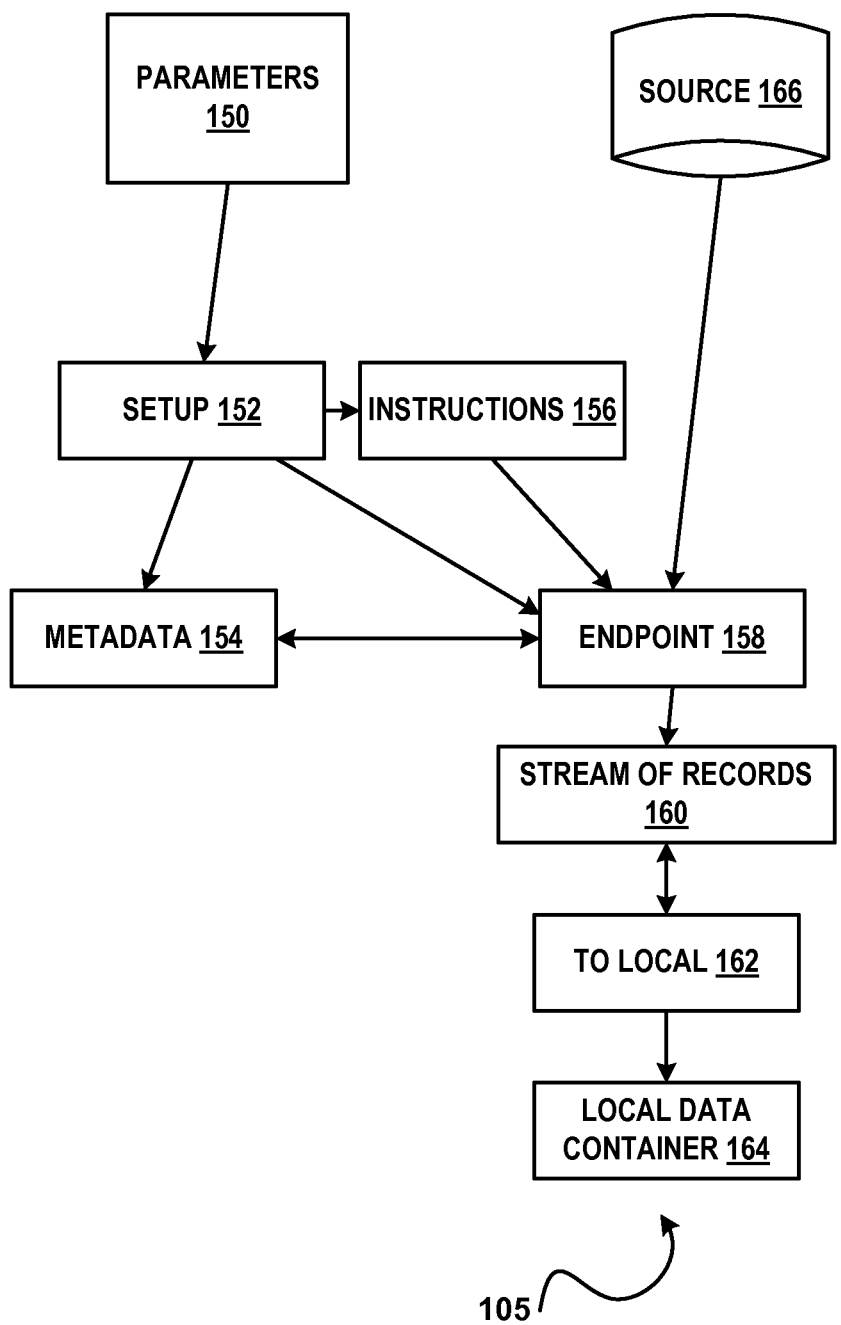
FIG. 1d illustrates an example 105 of an abstract local data input workflow in accordance with aspects of the subject matter described herein.

FIG. 1d illustrates an example 105 of a local input workflow. A local workflow can include various workflow components that can be composed into a particular instantiation of a local loader. All or portions of a local loader composed from a local input workflow may execute on one or more computers or computing devices such as the computers described below with respect to FIG. 3. Contemplated computing devices on which a local saver can run include but are not limited to desktop computers, tablet computers, laptop computers, notebook computers, personal digital assistants, smart phones, cellular telephones, mobile telephones, and so on. A computing device can include one or more processors and a memory that communicates with the one or more processors. A local loader or portions thereof may be provided as a stand-alone system or as a plug-in or add-in. A local loader or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

A local input workflow can include one or more local workflow components or plug-ins. A workflow component can comprise: a setup component such as setup component 152, an endpoint component such as endpoint component 158 and/or a ToLocal component such as ToLocal component 162. The setup component 152 can receive a set of parameters such as parameters 150 and an implicit or explicit reference to a local data source such as local data source 166. The setup component 152 can return metadata such as metadata 154 (e.g., a metadata object) describing the input data. The setup component 152 can return instructions such as instructions 156 (e.g., an instruction object) that indicates which portion of the source 166 to read from. An endpoint component such as endpoint component 158 can update the metadata 154. The endpoint component 158 can receive the metadata 154 and instructions 156 and can return a sequence of records such as stream of records 160. A record in accordance with aspects of the subject matter described herein can represent a logical block of the input data from source 166.

A ToLocal component such as ToLocal component 162 can assemble the sequence of records into a local data container such as local data container 164. Suppose for example, source 166 is a local file. Setup component 152 can receive the path to the file (and potentially additional parameters) and can examine the file to determine what parts are the header parts of the file and what parts are actual data sections. Setup component 152 can create metadata that describes the content of the file. Metadata can include information such as: the file delimiters such as column or row delimiters and so on. The setup component can generate instructions that describe where in the file to start reading and where to stop reading. The endpoint component can start reading the data in accordance with the instructions and can generate a sequence of records. The ToLocal component 162 can synthesize the records into a local data container such as for example, a local array or local data table, etc.

Below is an example of program code that can be used to construct a local loader. Although this code is written in CSharp, it will be appreciated that the code to construct a local loader can be written in any number of different programming languages, known or developed in the future. An example of program code written in CSharp representing a sample output framework API and that constructs a local loader is:

```
Func<T1, TResult> CreateLoader<T1, TRecord, TResult, TMetadata,
    TInstruction>(Func<T1, Tuple<TMetadata, TInstruction>> setup,
    Func<TMetadata, TInstruction, IEnumerable<TRecord>> endpoint,
    Func<TMetadata, IEnumerable<TRecord>, TResult> local);
```

The code above can generate a local reader. The setup component in the second line receives parameters (of type T1) and returns metadata (of type TMetadata) and instructions of type TInstruction. Setup receives either explicitly or implicitly a reference to the data source (e.g., a file path). Setup can examine the data source to detect header data sections, etc. The metadata can describe the content of the data source such as what the column and row delimiters are and so on. In the code above setup creates another object of type TInstructions. The instruction object includes instructions for where to start reading the data source and where to stop reading the data source. The third line of code indicates that the component endpoint starts reading the data source as instructed by the instructions and as described by the metadata returned by setup. Endpoint generates a sequence of records, as indicated by the IEnumerable interface. The local component then can synthesize records into local array, local data table, etc. in which each row in the storage system matches to a row in the data container in memory.

Figure 1E:
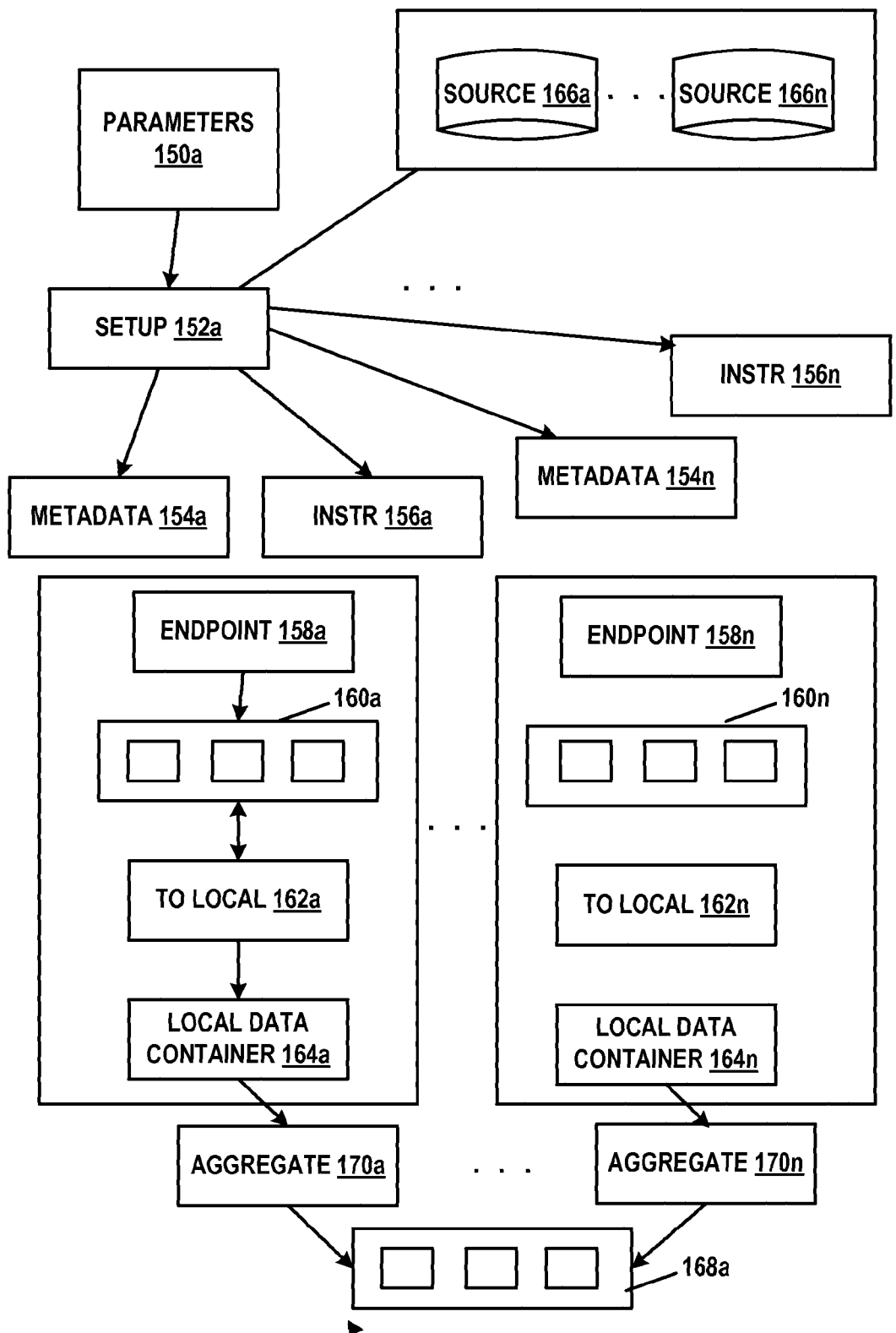
FIG. 1e illustrates an example 107 of an abstract distributed data input workflow in accordance with aspects of the subject matter described herein.

FIG. 1e illustrates an example 107 of a distributed input workflow. A distributed input workflow can include various workflow components that can be composed into a particular instantiation of a distributed loader. All or portions of a distributed loader composed from a distributed input workflow may execute on one or more processors or one or more computers or computing devices such as the computers described below with respect to FIG. 3. Contemplated computing devices on which a distributed loader may run include but are not limited to desktop computers, tablet computers, laptop computers, notebook computers, personal digital assistants, smart phones, cellular telephones, mobile telephones, and so on. A computing device can include one or more processors and a memory that communicates with the one or more processors. A distributed loader or portions thereof may be provided as a stand-alone system or as a plug-in or add-in. A distributed loader or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

A distributed input workflow can include one or more distributed workflow components or plug-ins. A distributed input workflow component can comprise: a setup component such as setup component 152a, two or more endpoint components such as endpoint component 158a, etc. . . . to endpoint component 158n, two or more components such as ToLocal component 162a, etc. . . . to ToLocal component 162n and/or two or more aggregate components such as aggregate component 170a, etc. . . . to aggregate component 170n. The setup component 152a can receive a set of parameters 150a. It can receive an implicit or explicit reference to a distributed data source such as distributed data source 166a, etc. . . . to distributed data source 166n. The distributed data source can be the same, for example, data source 166a and data source 166n can be the same. The setup component 152a can return metadata such as metadata 154a describing distributed data source 166a, and so on, returning metadata 154n describing distributed data source 166n. The setup component 152a can return instructions 156a that indicate which portion of the distributed data source 166a to read from and so on, setup component 152a returning instructions 156n that indicate which portion of the distributed data source 166n to read from.

An endpoint component such as endpoint component 158a can update the metadata 154a and so on for each process such that endpoint component 158n can update the metadata 154n. Endpoint component 158a can receive the metadata 154a and instructions 156a and can return a sequence of records such as stream of records 160a and so on, endpoint component 158n receiving metadata 154n and instructions 156n and returning stream of records 160n. A record in accordance with aspects of the subject matter described herein can represent a logical block of the input data from source 166a, etc. . . . through distributed data source 166n.

A ToLocal component such as ToLocal component 162a, etc. . . . to ToLocal component 162n can assemble the stream of records 160a, etc. . . . to stream of records 160n into a local data container such as local data container 164a, etc. . . . to local data container 164n. Aggregate components such as aggregate component 170a, etc. . . . to aggregate component 170n can synthesize local data containers into a distributed container such as distributed container 168a. In accordance with some aspects of the subject matter disclosed herein, the aggregate components communicate between the processes. That is, the aggregate component of process 0 communicates with all the other processes and so on. Each process has to know the size of the local data tables of the other processes. Suppose, for example, process 0 has a data table with ten values in it. Process 1 has to know that so that it can compute the values for the global index, (e.g., its first value will be 11, etc.).

Below is an example of program code that can be used to construct a distributed loader. Although this code is written in CSharp, it will be appreciated that the code to construct a distributed loader can be written in any number of different programming languages, known or developed in the future. An example of program code written in CSharp representing a sample input framework API and that constructs a distributed loader is:

```
Func<T1, TResult> CreateLoader<T1, TRecord, TLocal, TResult,
    TBroadcast, TInstruction>(Func<T1,
    IMultipleStreamInstructions<TBroadcast,
    TInstruction>> setup, Func<TBroadcast, TInstruction,
    IEnumerable<TRecord>> endpoint,
    Func<TBroadcast, IEnumerable<TRecord>, TLocal> local,
    Func<TLocal, TResult> aggregate);
```

Figure 2:
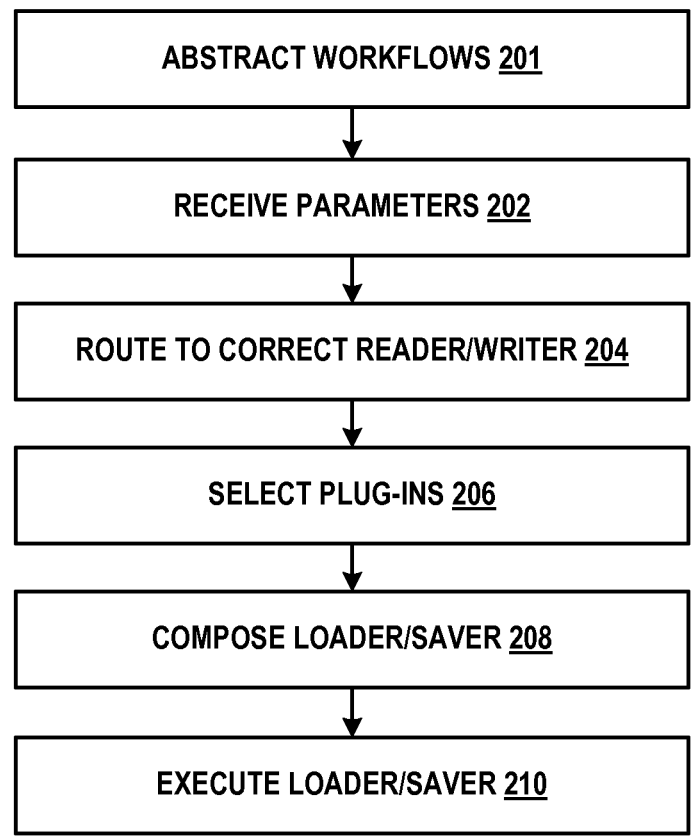
FIG. 2 illustrates an example of a method 200 of using system 100 to create a data loaders and/or a data saver in accordance with aspects of the subject matter disclosed herein.

FIG. 2 illustrates an example of a method 200 for authoring componentized data loaders and data savers in accordance with aspects of the subject matter described herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, data transfer operations can be abstracted into generic workflows comprising component plug-ins at operation 201. At operation 202, parameters can be received. As described more fully above, the parameters can include information such as but not limited to: the direction of data transfer (input or output), the data flow scenario (local or distributed), data format for input and output, storage system and container type. At operation 204 the appropriate reader/writer can be called, creating a level of indirection so that changes to the generation framework do not affect application code. A reader/writer manages a set of data transfer configurations. At operation 206 the appropriate plug-ins for a given configuration can be selected and can be provided to the generation framework, as described more fully above. At operation 208 a particularized instantiation of a data loader and/or data saver can be composed using the parameters received in operation 202 and the plug-ins selected at operation 206. At operation 210 the loader/saver can be invoked to effect the data transfer.

Example of a Suitable Computing Environment

Figure 3:
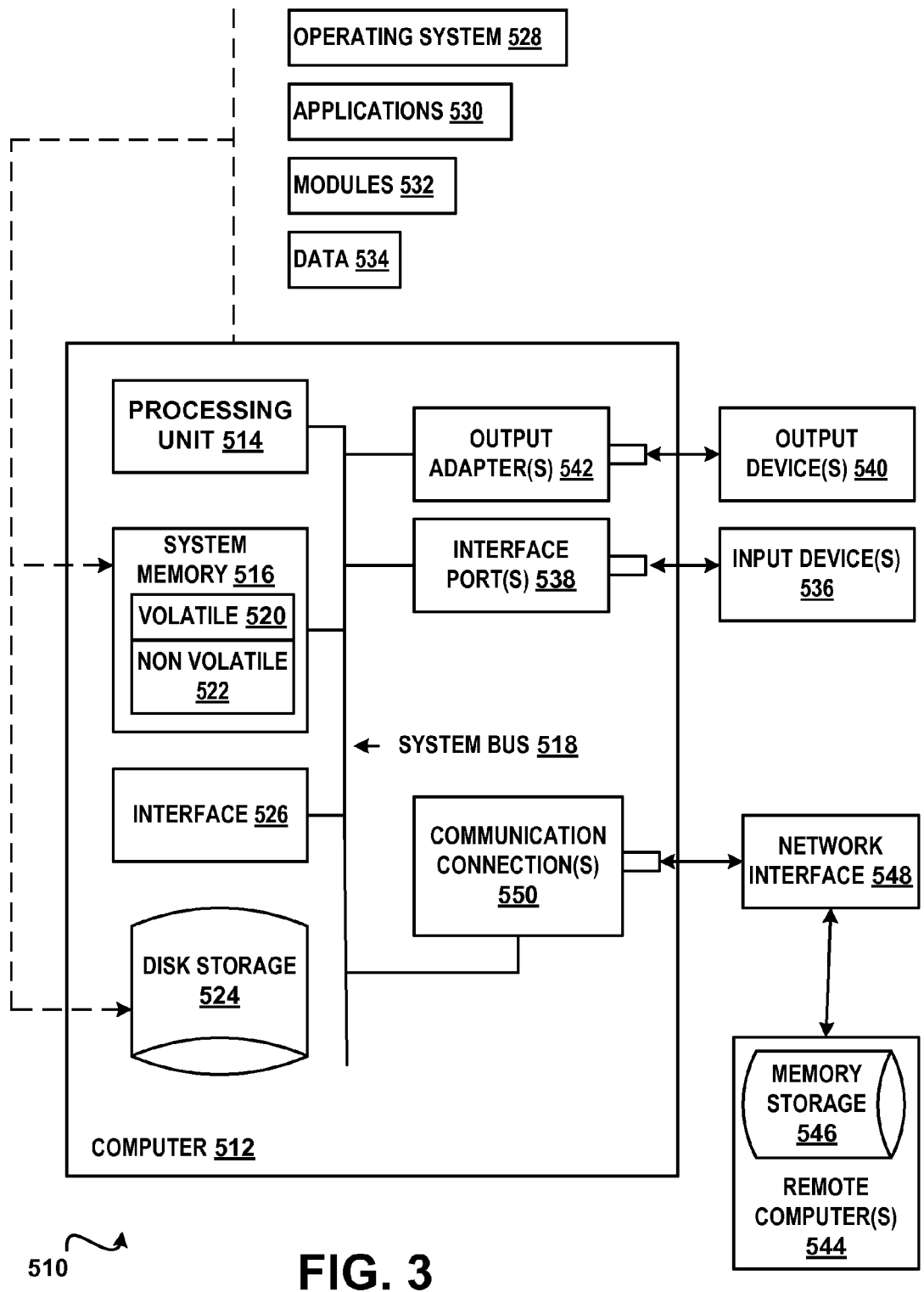
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a memory connected to the at least one processor, wherein the at least one memory and the at least one processor are respectively configured to store and execute instructions, including instructions for causing the system to:
   abstract, with a data transfer framework, data transfer operations into a plurality of generic workflows, the data transfer framework dynamically composing components of a particular generic workflow of the plurality of generic workflows into a data transfer executable for a particular data flow scenario, data flow direction, data format to convert from or to, data container and storage system.

2. The system of claim 1, wherein the data transfer framework is extensible.

3. The system of claim 1, wherein a data flow scenario is one of local or distributed.

4. The system of claim 1, wherein the data transfer framework coordinates communications between a plurality of processes in a distributed data transfer scenario.

5. The system of claim 1, wherein a component of a generic output workflow is at least one of:
   a setup component that receives parameters comprising a reference to a data container and returns a modifiable record that indicates workflow state;
   a decomposer that partitions a data container into a sequence of blocks;
   a formatter that serializes a block of the sequence of blocks and returns a memory buffer comprising the block;
   a storage writer that writes the memory stream to a storage system; or
   a finalizer that in response to determining that serialization of the sequence of blocks was unsuccessful rolls back partial writes.

6. The system of claim 5, wherein a component of the generic output workflow is a committer that performs a global commit operation.

7. The system of claim 1, wherein a component of the generic input workflow is one of:
   a setup component that receives parameters and returns metadata describing input data from a source and instructions indicating a portion of the source to read from;
   an endpoint component that receives the metadata and the instructions and returns a sequence of records; or
   a component that assembles the sequence of records into a data container.

8. A method comprising:
   abstracting data transfer operations into a plurality of generic componentized workflows;
   receiving parameters identifying aspects of a particular data flow scenario;
   selecting components associated with a generic workflow corresponding to the particular data flow scenario; and
   dynamically composing the selected components into a data transfer executable.

9. The method of claim 8, wherein the particular data flow scenario is local.

10. The method of claim 8, wherein the particular data flow scenario is distributed.

11. The method of claim 8, wherein the data transfer executable is a data loader that loads data into memory.

12. The method of claim 8, wherein the data transfer executable is a data saver that saves data to a storage system.

13. The method of claim 8, further comprising:
    reusing components stored in a component library.

14. A computer-readable storage medium comprising computer-readable instructions which when executed cause at least one processor of a computing device to:
    invoke a data transfer framework in which data transfer operations are abstracted into a plurality of generic workflows, the data transfer framework dynamically composing components of a particular generic workflow of the plurality of generic workflows into a data transfer executable for a particular data flow scenario, data format to convert from or to, data container and storage system.

15. The computer-readable storage medium of claim 14, comprising further computer-readable instructions which when executed cause the at least one processor to:
    establish a level of indirection between application code and the data transfer framework such that a modification to the data transfer framework is transparent to the application code.

16. The computer-readable storage medium of claim 14, comprising further computer-readable instructions which when executed cause the at least one processor to:
  abstract data transfer operations into a plurality of generic componentized workflows.

17. The computer-readable storage medium of claim 14, comprising further computer-readable instructions which when executed cause the at least one processor to:
  receive parameters identifying aspects of a particular data flow scenario;
  select components associated with a generic workflow corresponding to the particular data flow scenario; and
  dynamically compose the selected components into a data transfer executable.

18. The computer-readable storage medium of claim 14, comprising further computer-readable instructions which when executed cause the at least one processor to:
  compose a data saver.

19. The computer-readable storage medium of claim 14, comprising further computer-readable instructions which when executed cause the at least one processor to:
  compose a data loader.

20. The computer-readable storage medium of claim 19, comprising further computer-readable instructions which when executed cause the at least one processor to:
  synchronize communications between a plurality of processes in a distributed data transfer scenario.

\* \* \* \* \*